No. 847,213. PATENTED MAR. 12, 1907.
J. A. SWENSON.
LAWN MOWER.
APPLICATION FILED APR. 4, 1906.
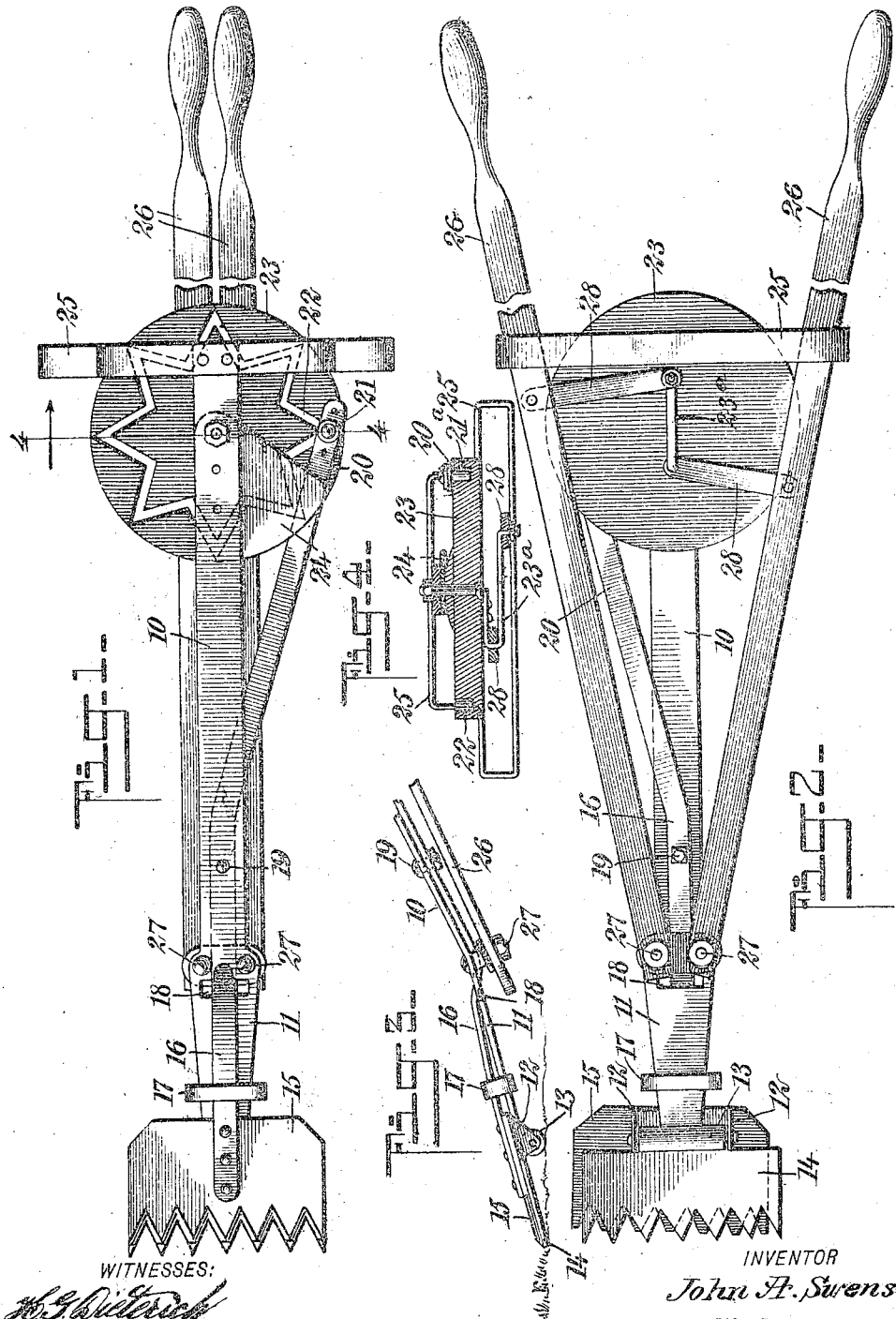
WITNESSES:
INVENTOR
John A. Swenson
BY Munn & Co
ATTORNEYS

UNITED STATES PATENT OFFICE.

JOHN A. SWENSON, OF NEW YORK, N. Y.

LAWN-MOWER.

No. 847,213.　　　Specification of Letters Patent.　　Patented March 12, 1907.

Application filed April 4, 1906. Serial No. 309,810.

*To all whom it may concern:*

Be it known that I, JOHN A. SWENSON, a citizen of the United States, and a resident of the city of New York, borough of Brooklyn, in the county of Kings and State of New York, have invented a new and Improved Lawn-Mower, of which the following is a full, clear, and exact description.

My invention relates to a lawn mower or clipper which while capable when constructed of strong enough materials of being employed for the ordinary operation of mowing lawns is especially designed for use in clipping around the edges and in places inaccessible by ordinary lawn-mowers.

The principal objects of the invention are to provide for locating the cutting-knives in such a position that they will cut to the surfaces of fences, trees, and other obstructions and to provide means whereby the cutting-knives can be readily manipulated by hand.

Reference is to be had to the accompanying drawings, forming a part of this specification, in which similar characters of reference indicate corresponding parts in all the figures.

Figure 1 is a plan of an instrument constructed in accordance with the principle of my invention. Fig. 2 is a bottom plan view of the same. Fig. 3 is a side elevation of the cutting end of the implement, showing the parts in position for operation; and Fig. 4 is a sectional view on the line 4 4 of Fig. 1.

While, as I have said, the principle can be carried out in a structure in which the device is mounted on wheels which pass over the ground and operate the cutting members, I prefer to construct it in such a manner that the cutting members will be readily operable by hand, and I have chosen this form of the invention for illustrating purposes. In this form the device is constructed with a frame 10, this frame having a tongue 11 projecting to the front, and on the under side of this tongue are located bearings 12 for a roller 13, which is adapted to rest on the ground and support this end of the device. On this tongue is mounted a stationary plate 14, provided with cutting-teeth and constituting part of the cutter, although it will be obvious that any other form of cutting-blade can be employed. Located over this blade is another cutter 15, designed to slide over the surface of the first-mentioned cutting-blade and perform the cutting operation in an obvious manner. The latter blade is mounted on a lever 16, which passes through a guide 17 on the tongue 11 and also passes through a perforation 18 in said tongue, so as to extend below it. It is pivoted on the frame 10 by means of a bolt, stud, or the like 19 and is bent outwardly to form an arm 20, which is provided with a stud 21, carrying a roller 21$^a$, designed to operate in a cam-groove 22 in a rotatable or oscillatory disk 23. It will be obvious that with the groove 22 formed in the manner shown or in any other way, so as to move the arm 20 when the disk rotates or oscillates, such movement of the disk will result in moving the cutter 15 across the blade 14 and perform the cutting operation. In order to hold the arm 20 in proper position on the disk, a guard-plate 24, mounted on the frame 10, is employed. The frame is also provided with a guiding-strap 25, passing over the disk and constituting a loop, through which pass a pair of handles 26. These handles are pivoted on the frame by means of bolts 27 or the like and extend to a point near or below that at which the lever is pivoted to the frame. Each one of these arms is pivotally connected with a link 28, these links being pivoted to a double crank 23$^a$, attached to the disk 23 at the center thereof, so as to provide for rotating or oscillating the disk by rocking the handles back and forth. It will of course be understood that when the disk is simply oscillated some parts of the groove 22, as shown, are not employed; but when it is rotated a complete revolution it is necessary to have the groove extend entirely around the disk, this being the feature of the design.

It will be observed that when the machine is constructed in accordance with the principle set forth above, whether in the form shown or not, the cutting operation can be readily performed in the most simple manner and all otherwise-inaccessible parts of a lawn can be reached and clipped by the device without necessitating any severe labor on the part of the operator.

In practice if the device is of large size a continuous rotation will be imparted to the disk 23, but in operating the smaller sizes the disk will simply oscillate.

Having thus described my invention, I claim—

1. In a lawn-clipping device, the combination of a frame, a lever pivotally mounted thereon, a cutting-knife connected with said lever, a stud mounted on said lever, a disk having a cam-groove for receiving said stud, and means for oscillating said disk.

2. In a lawn-clipping device, the combination with a frame, a lever pivotally mounted thereon, a knife-blade on said lever, a stud connected with the lever, a disk journaled on the frame and having a cam-groove for receiving the stud, a pair of handles pivoted to the frame, and means whereby the rocking of the handles on their pivots will turn the disk.

3. In a lawn-clipping device, the combination of a frame, a lever pivotally supported thereby, a cutting-blade connected with said lever, a rotatable element for oscillating said lever, a pair of handles pivotally mounted on said frame, and means for connecting said handles with said rotatable element for turning said element when the handles are turned on their pivots.

4. A lawn-clipping device comprising a frame having a perforation, a blade mounted on said frame, a roller, journaled on the lower side of said frame below the blade, for supporting the frame on the ground, a lever pivotally mounted on the frame and extending through said perforation, a blade mounted on said lever and located adjacent to the first-named blade, a disk journaled on the frame and having a cam-groove for manipulating said lever, a guard on said frame surrounding the disk, a pair of handles extending through said guard and guided thereby, said handles being pivotally mounted on said frame, and a pair of links, one pivotally connected with each handle and each pivotally connected with the disk at opposite sides of the center thereof, said handles being located on opposite sides of the center of the disk.

In testimony whereof I have signed my name to this specification in the presence of two subscribing witnesses.

JOHN A. SWENSON.

Witnesses:
F. D. AMMEN,
JNO. M. RITTER.